J. R. HESTER.
COTTON CHOPPER.
APPLICATION FILED MAY 28, 1910.

1,000,599.

Patented Aug. 15, 1911.
2 SHEETS—SHEET 1.

WITNESSES

INVENTOR
James R. Hester
Attorney

J. R. HESTER.
COTTON CHOPPER.
APPLICATION FILED MAY 28, 1910.

1,000,599.

Patented Aug. 15, 1911.
2 SHEETS—SHEET 2.

WITNESSES
T. L. Mockabee
R. A. Jones.

INVENTOR
James R. Hester
H. Joseph Doyle
Attorney

UNITED STATES PATENT OFFICE.

JAMES R. HESTER, OF ROSCOE, TEXAS.

COTTON-CHOPPER.

1,000,599.  Specification of Letters Patent.  Patented Aug. 15, 1911.

Application filed May 28, 1910. Serial No. 563,935.

*To all whom it may concern:*

Be it known that I, JAMES R. HESTER, a citizen of the United States, residing at Roscoe, in the county of Nolan and State of Texas, have invented certain new and useful Improvements in Cotton-Choppers, of which the following is a specification.

This invention relates to certain new and useful improvements in cotton choppers and it has for its objects among others to provide a simple and efficient cotton chopping device readily attachable to cultivators of known construction.

The present invention may be constructed and embodied in such a manner as to form an integral part of a cultivator, or it may be so constructed as to be capable of being applied to cultivators of ordinary makes without any expensive structural changes in the latter.

It has for a further object to provide a cotton chopping device which shall possess superior advantages in simplicity, durability and general efficiency and which shall be capable of manufacture and application at minimum cost.

I aim also at improvements in the details of construction whereby better results are attained and liability of injury or derangement of the parts is reduced to a minimum.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figures 1, 3, 7:
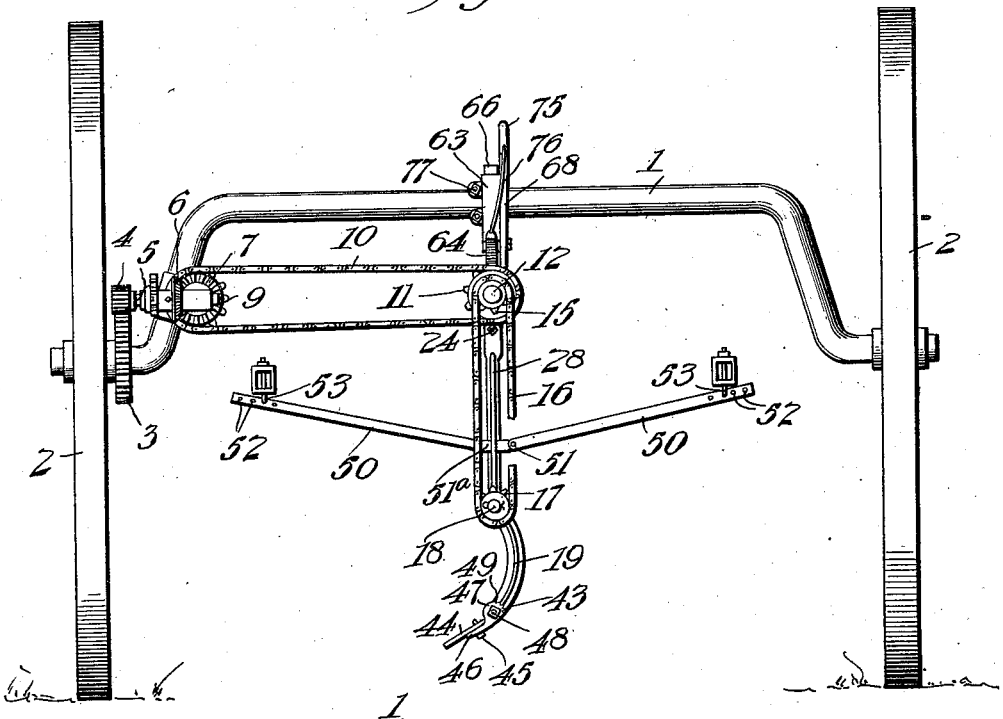
Figure 2:
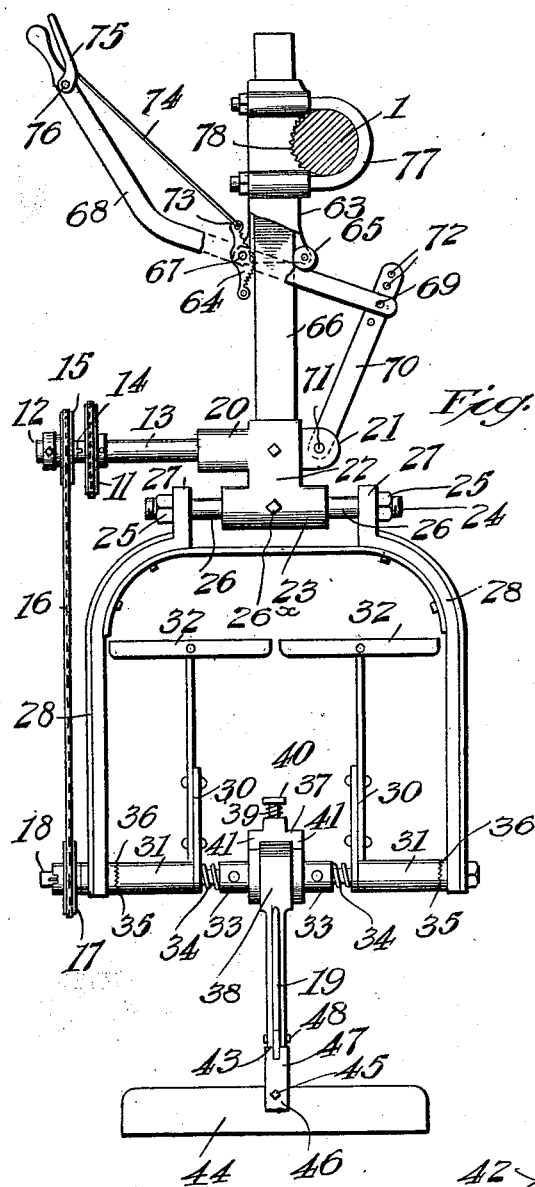
Figure 4:
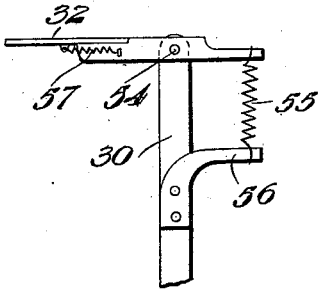
Figure 5:
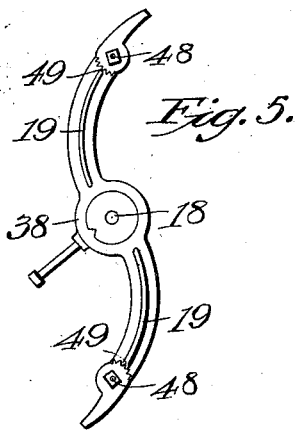
Figure 6:
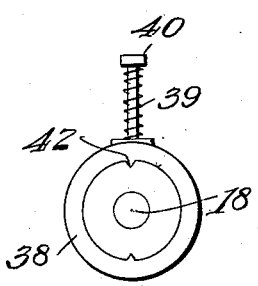

Figure 1 is a rear elevation of a cultivator provided with my improved cotton chopping attachment, only such parts of the cultivator as are necessary to a proper understanding of the invention being illustrated. Fig. 2 is an elevation at right angles to Fig. 1 with the axle in cross section. Fig. 3 is a detail partly in section, the same being taken at right angles to Fig. 1. Fig. 4 is a detail showing the scraper in side elevation. Fig. 5 is a detail view showing the means for adjusting the depth of the hoe. Fig. 6 is a detail of the means for preventing injury to the hoe when meeting an obstruction. Fig. 7 is a detail which will be more particularly hereinafter referred to.

Like numerals of reference indicate like parts throughout the several views.

Referring to the drawings, 1 designates the usual arched axle of the cultivator and 2 the wheels. As no parts of the cultivator proper are herein claimed, it is not deemed necessary to illustrate them nor to enter into a description thereof, it being understood that the invention, however, is in no wise confined to any particular make of cultivator as the improvement now to be described is applicable to any and all makes of cultivators without any material change in the cultivator construction. Also there are forms of cultivators to which my invention might be applied by slight alteration in the cultivator construction.

My improvements are as follows:

Suitably mounted upon the hub of one of the wheels is a gear wheel 3 which is designed to mesh with a smaller pinion 4 on a shaft 5 carrying a bevel pinion 6 meshing with a bevel pinion 7 on a shaft 8, on which latter shaft is a sprocket wheel 9, around which passes a chain 10, which, in turn, passes around a sprocket wheel 11 on the shaft 13, whereby motion is imparted to said sprocket wheel 11 by the rotation of the wheel 2. This sprocket 11 is coupled to a sprocket wheel 15 on the outer end 12 of the shaft 13, as seen at 14 in Fig. 2, and on this shaft 12 is a sprocket wheel 15, around which passes a sprocket chain 16, which passes around a sprocket wheel 17 on a shaft 18, as seen clearly in Fig. 1, whereby motion is imparted to said shaft 18 through the medium of said chain and sprocket wheel. On this shaft 18 is secured the hoe standard 19, as seen clearly in Figs. 1 and 2.

The shaft 13 is supported at one end in the casting 20, see Fig. 2, provided with a lug 21 and a right-angled portion 22 terminating in the member 23 parallel with the member 20 that forms a bearing for the bearing rod 24 provided at its ends with nuts 25, as seen in Fig. 2, said rod passing through the sleeve or tube 26 on said rod between the ears or lugs 27 on the curved members 28 of the hoe swing, thus allowing the latter a swinging motion. These members 28 are provided at their lower ends with bearing sockets in which the swing-shaft 18 has bearings and on which are mounted the arms 30 extending from the scraper holders 31, which carry at their outer ends the scrapers 32. On the shaft 18 are adjustable collars 33, between each of which and the adjacent arm 30 is a spring 34. The hoe arm is held securely in position between these collars, as seen clearly in Fig. 2. The outer ends of these holders 31 are toothed or serrated, as seen at 35, to engage corresponding teeth or serrations 36 on the adjacent members.

37 is a crown latch pivoted loosely on the crown head 38 of the hub of the hoe arm and held in position by means of the spring 39 and the tension screw 40 that allows the crown latch to raise out of the seat when the hoe strikes an obstruction which it cannot remove or separate and thus permitting the shaft to revolve without injury to the hoe, which would, otherwise, occur. The crown latch has a toothed member 41 adapted to engage in a notch 42, as seen best in Fig. 6, but from which it may be thrown when the hoe meets an obstruction, so as to disengage the tooth from the notch and allow the shaft 18 to revolve, as above stated, without danger of injury to the parts.

The hoe arm is provided with a corrugated portion 43 and the hoe 44 is bolted, as at 45, to the extension 46 of the foot 47, which is pivotally mounted, as at 48, and is corrugated or toothed, as at 49, to engage the corrugations 43, so that the hoe may be set at any desired angle or as scooping as the operator may deem it best to adapt it to the condition of the soil.

Fig. 5 shows a modified form of hoe standard in which there are two such standards diametrically disposed and radiating from the same hub. At the outer end of each arm is a hoe with a corrugated heel coöperating with the corrugated foot piece so as to provide for setting the hoe in any position to meet the condition of the soil.

The two sprocket-wheels 11 and 15 on the shaft 13 are coupled together with corresponding sockets, as seen in Fig. 2, being held in position by collars on each side provided with set screws, whereby they are adjustable on their shaft so as to provide means for adjusting the chains 10 and 16.

The supporting block 20 which supports the shaft 13 and the parallel member 23 of said block constitutes a socket supporting the pipe or tube 26, which latter is a single tube and forms a bearing for the bearing rod 24 on which is secured the lugs 27 of the members 28. The socket member 23 may be moved either way on the tube 26, being secured at any desired point thereon by means of a set screw 26$^x$, as seen in Fig. 2, so as to provide means for adjusting the hoe swing in line with the axle frame 1 to line the sprocket wheels 9 and 11 coupled by the chain 10. The swing, therefore, takes the movement by the bearing rod passing through the tube 26 secured in said socket member 23 by means of the set screw.

The foot piece 47 is forked, from point to heel, and straddles the hoe arm at the heel where it is secured by a small bolt 48, the corrugated notches coming around the extreme part of the circle in front.

50 are links or the like pivotally mounted, as at 51, to the slide 51$^a$ on the swing members 28 and at their other ends provided with a plurality of openings 52 designed to receive the pins or the like 53 depending from the cultivator beams, so that as the cultivator beams are moved from side to side during the operation of the device, the swing arms and links swing to and fro and as the cultivator beams are widened, the said links rise at their inner ends and as the cultivator beams approach each other, the said links are lowered.

The straps or links 50 held at 51 between the joints of the slide or clamp and held at their outer ends by means of adjustable clamps and pins attached to the cultivator beams, provide means to hold the hoe evenly and continually between the cultivator beams and directly upon the row being operated upon. When the cultivator beams are widened, the straps 50 pull the clamp slide 51 upward on the members 28, and as they are closed, the slide lowers, thus permitting the cultivator beams to be adjusted independently of the chopper attachment.

The member 8, shown in Fig. 7, is made on a right angle with threads on either end; the short end is provided with a shoulder and forms a supporting or bearing shaft for the sprocket wheel 9 that is held in its position at the outer end by a T, which is secured on the shaft by threads and forms a shoulder for the other side of the sprocket. This T also provides a bearing socket for supporting the end of the shaft 5. The pinion 6 is integral or rigid with a sleeve 5$^x$ and these parts are secured to the shaft 5 by a set screw 6$^x$.

5$^a$ is a filler between the sleeve 5$^x$ and the lever 59 to hold the pinion 6 in position.

Referring to Fig. 4, it will be seen that the scraper 32 is pivotally mounted, as at 54, on its member 30, one end being connected to one end of a spring 55, the other end of which is attached to a lateral member 56 on the member 30, a spring 57 being also employed for connecting the scraper with its pivotal support, so as to allow the scraper to turn to one side and permit it to be depressed by the slope of the hoe and when released the same is restored to its proper position to catch the point of the hoe when it comes around again.

8, see Fig. 7, is a right-angled bearing shaft fitted with a shoulder to hold the sprocket wheel 9 and also threaded to secure the end of the lever 59, said bearing shaft is pivotally mounted in a bracket 8$^a$ attached to axle 1 and the lever is provided with a spring pawl 60, said pawl being adapted to engage the teeth of a notched or toothed open quadrant 62, fixed to bracket 8ᵃ as seen clearly in Fig. 3. Through lever 59 the pinion 4 may be thrown into or out of mesh with gear 3.

63 is a box or casing provided with two sets of jaws at the bottom, one for a corrugated snap 64 and the other for a roller 65 which permits the bar 66, to which the T-member 20 and the other parts are attached, to slide. The snap or cam member 64 is pivotally mounted, as at 67, on the casing 63.

68 is a lever, one end of which is pivotally connected, as at 67, to the casing 63, and the other end with an arm or link 70, which is pivotally mounted, as at 71, on the lug 21 extending from the member 20, as seen clearly in Fig. 2. This member 70 is provided with a plurality of holes 72, so that the position of the pivot 69 may be changed. The member 64 has connected therewith, as at 73, one end of the link or rod 74, the other end of which is connected with the lever 75, pivotally mounted, as at 76, on the lever 68. By this means, the grip member 64 may be readily controlled to control the movement of the bar 66, the roller 65 serving to reduce friction and permit of easy movement of the bar.

The box or casing 63 is clamped around the axle 1 by suitable clamp 77, one face being corrugated, as seen at 78, so as to insure a tight grip.

The operation will be clearly understood from the foregoing description when taken in connection with the annexed drawings and a further detailed description thereof is not deemed necessary.

From the above it will be seen that I have devised a simple, cheap and efficient form of cotton chopper attachment, readily applied to any form of cultivator, and, while the structural embodiment of the invention as hereinbefore disclosed is what I at the present time consider preferable, it will be obvious that the same is subject to changes, variations and modifications without departing from the spirit of the invention or sacrificing any of its advantages. I, therefore, do not intend to restrict myself to the particular construction and arrangement of parts, proportions, etc., hereinbefore specified, but reserve the right to make such changes, variations and modifications as come properly within the scope of the protection prayed.

What is claimed as new is:—

1. A cotton chopper attachment for cultivators comprising in combination with the cultivator wheels, a gear wheel fast upon one of said wheels, a bevel pinion operated thereby, gearing operatively connected with said bevel pinion, a swinging frame, scrapers carried thereby, a chopper arm in said frame operatively connected with said gearing, and a chopper on said arm to contact with the scrapers.

2. In a cotton chopper attachment, the combination with the cultivator wheels, of a shaft geared with one of the cultivator wheels, a chopper arm operatively connected with said shaft, a chopper on said arm, a swinging frame in which the said shaft is mounted, and scrapers carried by said frame for contact with the chopper.

3. In a cotton chopper attachment, the combination with the cultivator wheels, of a shaft geared with one of the cultivator wheels, a chopper arm operatively connected with said shaft, a chopper on said arm, a swinging frame in which the said shaft is mounted, and scrapers carried by said swinging frame and mounted to yield as the chopper contacts therewith.

4. In a cotton chopper attachment, the combination with the cultivator wheels, of a shaft geared with one of the cultivator wheels, a chopper arm operatively connected with said shaft, a chopper on said arm, a swinging frame in which the said shaft is mounted, scrapers carried by said swinging frame and mounted to yield as the chopper contacts therewith, and springs for returning the scrapers to their normal position.

5. In a cotton chopper attachment, a rotary hoe arm, a member pivotally connected therewith, a hoe carried by said pivotally mounted member, a swinging frame carrying said hoe arm, and relatively fixed scrapers in the path of the hoe.

6. In a cotton chopper attachment, a rotary hoe arm, a member pivotally connected therewith, a hoe carried by said pivotally mounted member, a swinging frame carrying said hoe arm, and relatively fixed scrapers in the path of the hoe, said scrapers being yieldably mounted to permit of the passage of the hoe without injury.

7. In a cotton chopper attachment, a rotary hoe arm, a member pivotally connected therewith, a hoe carried by said pivotally mounted member, a swinging frame carrying said hoe arm, relatively fixed scrapers in the path of the hoe, said scrapers being yieldably mounted to permit of the passage of the hoe without injury, and springs for returning the scrapers to their normal positions.

8. In a cotton chopper attachment for cultivators, the combination with an axle, of a casing secured thereto, a bar movable within the casing, a roller mounted on the casing for contact with said bar, and a cam grip on the casing acting on the bar in opposition to said roller.

9. In a cotton chopper attachment for cultivators, the combination with an axle, of a casing secured thereto, a bar movable within the casing, a roller mounted on the casing for contact with said bar, a cam grip on the casing acting on the bar in opposition to said roller, a pivotally mounted lever, and means mounted thereon and connected with said cam grip to control the latter.

10. In a cotton chopper, the combination with a cultivator including supporting beams, an axle, and wheels for said axle, of a swinging frame carried by said axle, a rotary shaft carried by said frame, a hoe carried by said shaft, scrapers carried by said frame and in the path of movement of said hoe, means operated by one of said wheels for actuating said shaft, and braces connecting said frame to said beams.

11. In a cotton chopper attachment for cultivators, a swinging frame, a rotary shaft in said frame, a chopper arm on said shaft, a chopper carried by said arm, scrapers carried by the frame for contact with said chopper, and means for allowing of disconnection of the arm and shaft upon meeting an obstruction.

In testimony whereof I affix my signature in presence of two witnesses.

JAMES R. HESTER.

Witnesses:
 JOHN W. ROSS,
 F. W. REES.

---

Copies of this patent may be obtained for five cents each, by addressing the "Commissioner of Patents, Washington, D. C."